Dec. 23, 1941.　　J. P. SEAHOLM　　2,266,818
SWEEP
Filed June 3, 1940
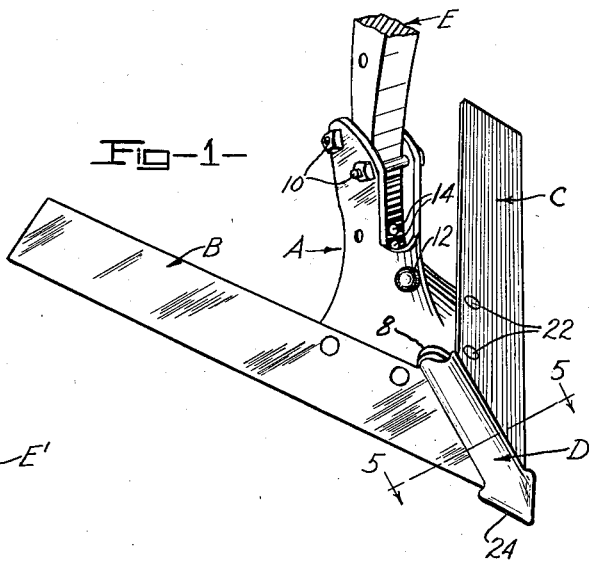
Fig-1-
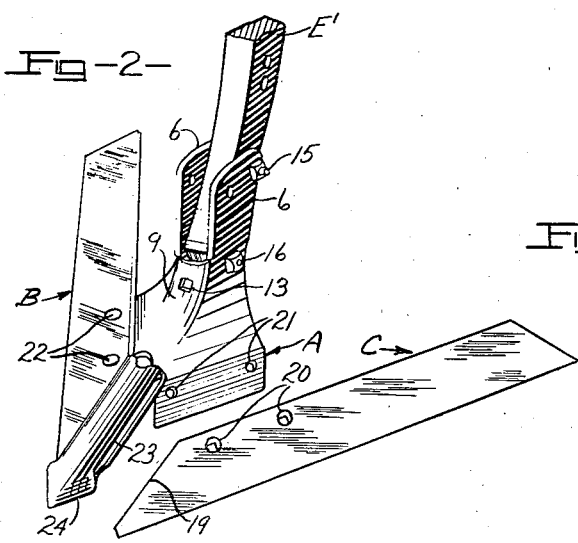
Fig-2-
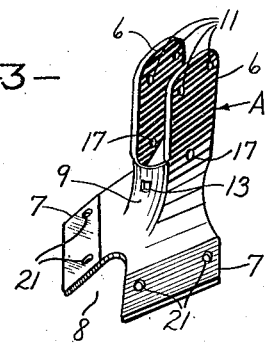
Fig-3-
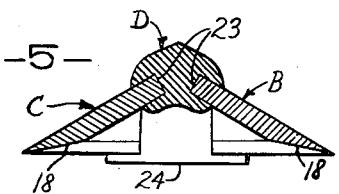
Fig-5-
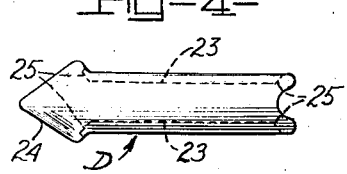
Fig-4-
Inventor
JOHN P. SEAHOLM
By Carlsen & Hazle
Attorneys Patented Dec. 23, 1941

2,266,818

UNITED STATES PATENT OFFICE 2,266,818

SWEEP

John P. Seaholm, Moline, Ill., assignor to Minneapolis-Moline Power Implement Company, Minneapolis, Minn., a corporation of Delaware Application June 3, 1940, Serial No. 338,535

2 Claims. (Cl. 97—205)

This invention relates to improvements in agricultural implement sweeps such as used in the cultivation and working of the soil around growing crops, and for summer fallow working of fields.

Such sweeps are generally formed of a forwardly pointed and rearwardly flaring or diverging blade which is provided with some sort of attachment to the beam or implement part on which it is supported. The wings or sides thus formed have the desirable action of cutting out the weeds, vines and like growth and affording a surface cultivation of the soil. However, when such tools become worn they must be replaced in their entirety and also when circumstances require a greater overall width or span, complete replacement is necessary. Furthermore, the inition fabrication or manufacturing cost is high since there is a very considerable waste of material in cutting out and forming the sweeps due to their very nature and shape.

It is the primary object of this invention, therefore, to provide a sweep structure embodying a basic mounting foot unit or frog, a pair of separate blades or wings for fastening thereto and lastly a point or nose piece adapted to be held in place by the blades. It is therefore possible to replace either the blades or the nose piece, when they become worn, without discarding other parts, and likewise blades of different length may be employed in order to vary the effective width of the sweep. The blades themselves may be of flat rectangular shape cut to proper length and angled off at forward ends to properly meet the nose piece and therefore very little waste will result in the manufacture of the blades of this type.

These and other more detailed and specific objects will be disclosed in the course of the following specification, reference being had to the accompanying drawing, in which—

Fig. 1 is a perspective view of a sweep constructed in accordance with this invention and mounted on an implement beam.

Fig. 2 is also a perspective view but showing one blade removed and showing the sweep mounted on a different type of implement beam.

Fig. 3 is a perspective of the mounting unit, foot or frog, alone.

Fig. 4 is a plan view of the nose piece or point alone.

Fig. 5 is an enlarged vertical cross sectional view through a forward portion of the sweep substantially along the line 5—5 in Fig. 1.

Referring now more particularly and by reference numerals to the drawing, my invention is made up of four main parts or units comprising the mounting foot, or frog member, A, the rearwardly diverging blades B and C and the nose piece D arranged at the point of the sweep, all of which parts in assembled relation are carried, through the frog, on the beam E of the implement.

The foot or frog A is pressed from sheet material to provide the upwardly extending and transversely spaced tangs or ears 6 and the downwardly and outwardly flaring mounting wings or flanges 7. These flanges taper or converge forwardly and between their forward ends a notch 8 is formed. From this notch 8 upwardly there is a rounded and arcuated leading edge 9 terminating at the tangs 6 so that at both front and rear the edges of the tangs are open as shown.

This unit A may be mounted on the tool carrying member or beam E by inserting clamp bolts 10 through openings 11 in upper corners of the tangs 6 at both front and rear of the beam. A single mounting bolt 12 is then passed through an opening 13 in the leading edge 9 and through any one of a series of vertically spaced openings 14 formed from front to rear through the lower end of the beam. A beam of this well known type thus permits convenient mounting and vertical adjustments of my mounting unit, as will be evident.

The beam, designated at E', in Fig. 2, is of a different type in that no openings, such as 14, are provided. In this case my unit A is mounted by placing one bolt 15 through the openings 11 and through an opening in the beam and another bolt 16 through lower openings 17 formed in the tangs 6. It will be evident, therefore, that my mounting unit is versatile in its adaptation to almost any type of implement beam.

The blades B and C are formed of flat, elongated shape and are each beveled off along one lower edge as represented at 18. The intended forward ends of the blades are cut off angularly as represented at 19 and adjacent said forward ends the blades have openings 20 in upper or inner edges which register with openings 21 in the flanges 7 of unit A for the reception of mounting bolts 22. When thus mounted the forward ends of the blades lie parallel with the longitudinal axis of the sweep and extend forwardly from the mounting unit.

The position and angle of the flanges 7 in both horizontal and vertical planes are such that the blades B and C, when mounted, will flare in a rearward direction in conventional sweep formation and will incline downwardly and outwardly toward their sharpened lower edges 18. The mounting bolts 22 of course have their flattened and beveled heads outwardly disposed to lie flat with the outer surfaces of the blades, and it is apparent that the inner, nut-equipped ends of the bolts are easily accessible from the lower or rear side of the mounting foot.

The nose piece D is of narrow or elongated shape and has grooves 23 in its opposite sides of a width and length just nicely proportioned to receive marginal portions of the angularly cut forward ends 19 of the blades B and C. Forwardly of these grooved sides the nose piece is pointed forwardly and downwardly as represented at 24. Both front and rear ends of the grooves 23 terminate short of the ends of the nose piece and are closed as designated at 25.

In assembling the sweep the blades B and C are mounted at forward ends into the grooves 23 of nose piece D and in this assembled relation the blades are secured to the unit A by the bolts 22. This rigid mounting of the blades retains the nose piece D in place since the closed ends 25 of the grooves prevent any endwise displacement relative to the blades. It is obviously possible by my invention to replace any one of the parts which become worn in use (the blades and nose piece) without discarding other unworn parts and without removing the sweep from the implement. Also blades of different length may readily be substituted whenever a sweep of different width is required, and since the blades are not themselves expensive parts the user may keep a goodly stock on hand to meet every emergency without requiring any great outlay.

The blades may be cut from strip or bar stock having a rolled or beveled edge and the only loss is the small triangular pieces formed when the angular forward ends 19 of the blades are cut. This reduction in waste and the convenience of cutting the blades makes their manufacture far less expensive than all other types of sweeps with which I am familiar.

It is understood that suitable modifications may be made in the structure as disclosed, provided such modifiactions come within the spirit and scope of the appended claims. Having now therefore fully illustrated and described my invention, what I claim to be new and desire to protect by Letters Patent is:

1. A sweep comprising a mounting member, a pair of blades secured to said mounting member and having forwardly extending and converging ends, said ends being spaced apart transversely, with respect to the line of travel of the sweep, a nose piece mounted between forward ends of the blades and having grooves in opposite sides to receive and engage marginal portions of said ends, and the said grooves being closed at front and rear ends to prevent endwise displacement of the nose piece from its position between the forward ends of the blades.

2. An agricultural sweep comprising a mounting member having a pair of side flanges extending in forwardly converging relation and spaced apart at forward ends, blades mounted on said flanges in corresponding forwardly converging and extending positions and having their forward extremities spaced apart transversely with respect to the line of travel of the sweep, a nose piece disposed between the forward extremities of the flanges and blades and extending in a lengthwise direction, the said nose piece having grooves in its sides to receive and engage the forward extremities of the blades and thereby support the nose piece between the blades, and the said nose piece having means for engaging the blades to prevent forward and rearward displacement of the nose piece relative to the blades.

JOHN P. SEAHOLM.